July 2, 1963
R. D. WIGHT
3,096,128
IDLER ARM SUPPORT BEARING
Filed Aug. 31, 1960
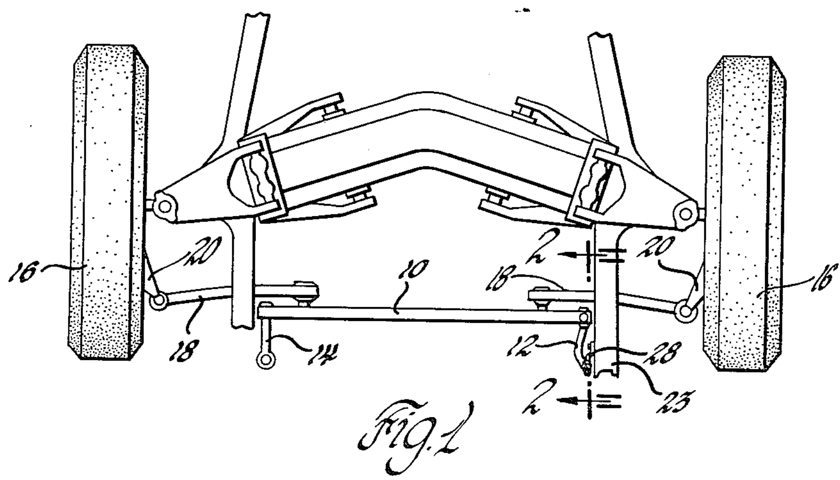
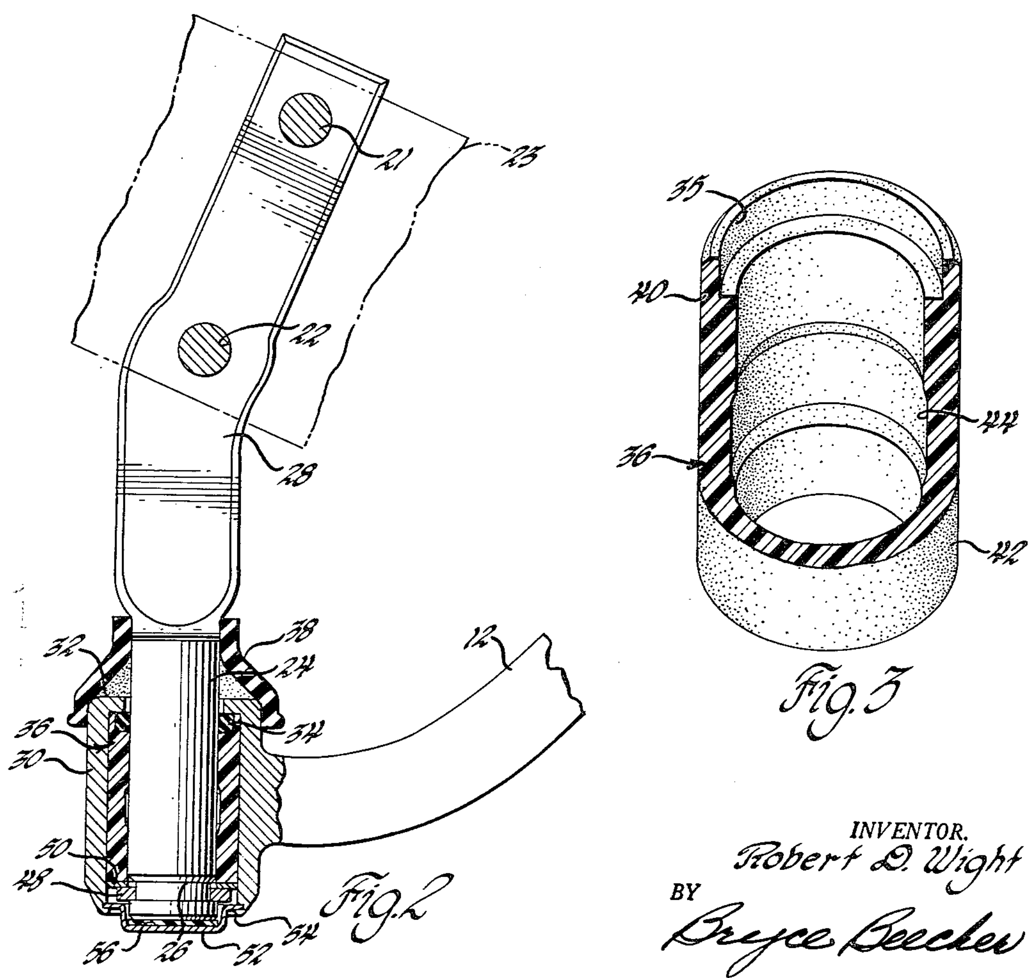
INVENTOR.
Robert D. Wight
BY
Bryce Beecher
ATTORNEY United States Patent Office 3,096,128

Patented July 2, 1963

1

3,096,128

IDLER ARM SUPPORT BEARING

Robert D. Wight, Saginaw, Mich., assignor to General Motors Corporation, Detroit, Mich., a corporation of Delaware Filed Aug. 31, 1960, Ser. No. 53,226
3 Claims. (Cl. 308—36.1)

This invention relates to a joint assembly for interconnecting two parts one of which is rotatable relative to the other, such assembly being subject to forces tending to rock it in directions angular to the axis of rotation. Specifically, the invention is concerned with the assembly as applied to join a steering idler arm to a support bracket.

Heretofore a threaded joint has been employed between the support bracket and the idler arm. It has been long recognized that this threaded joint is less stable than would be desirable. Also, operation of the threaded joint is marked by a "chuckling" noise representing an effect of the free fit between the parts. Such noise has given rise to complaints which are difficult to dismiss on the basis that it is "normal."

In accordance with the present invention, a joint is provided comprising a plastic bushing so applied that the joint is substantially more stable than the prior joint and operates without discernible noise.

A preferred embodiment of the invention is illustrated by the accompanying drawings which will be referred to in the further description.

In the drawings:

FIGURE 1 is a somewhat diagrammatic plan view showing a steering linkage incorporating an idler arm support joint conforming to the invention;

FIGURE 2 is a view on the line 2—2 in FIGURE 1, certain parts appearing in section; and FIGURE 3 illustrates the construction of a bushing element comprised in the joint.

Referring first to FIGURE 1, the numeral 10 denotes a relay rod supported at one end by an idler arm 12 and at the other end by a pitman arm 14. As well understood in the art, the pitman arm 14 is mounted for swinging movement about a fixed axis to impart a shifting movement to the relay rod 10. Each of the dirigible wheels 16 will be seen connected to the relay rod 10 by means of a tie rod 18 and a steering knuckle arm 20.

Going now to FIGURE 2, the idler arm support bracket 28 is provided with a pair of holes 22 adapted to accommodate bolts 21 whereby the bracket is secured to the vehicle frame 23. The bracket terminates in a cylindrical journal portion 24 which is annularly recessed at 26.

Idler arm 12 is formed with an integral eye portion 30 including an inwardly extending flange or rib 32. Such flange or rib acts to retain a grease seal 34 carried in an annular recess 35 formed in a bushing 36 disposed between the journal 24 and the inner wall of the eye 30. It is contemplated that the joint will be lubricated only once, that being at the factory as an incident of its assembly. The lubricant is introduced in the area under the seal 34 and soon becomes fully distributed throughout the bearing surfaces due to the ready wetting qualities of the plastic material of which the bushing is composed. A boot 38 serves the obvious purpose of preventing the entry of dirt and other foreign matter into the joint.

The material of which the bushing 36 is formed is desirably Delrin, an acetal resin. However, other plastics can be employed, for example, polymeric amides and polyethylene type high polymers such as nylon, Teflon and the like.

2

Before installation of the bushing, the same appears as illustrated by FIGURE 3. From such figure it should be noted that the internal diameter of the bushing is less at the end portions 40 and 42 than along the central portion 44. The purpose of the annular relief at 44 is to reduce the torque required to rotate the arm 12 on the support, as subsequently explained. Bushing 36 has a press fit in the eye 30 while journal 24 has a press fit in the bushing, the latter fit being a press fit solely by reason of the portions 40 and 42 of the bushing.

To prevent axial separation of the parts of the joint, a lock ring 48 (FIGURE 2) is located in the recess 26 of the journal 24. This ring bears against a thrust washer 50 spacing the end of the bushing and the lock ring. A cover 52 located by spinning-over the metal of the eye at 54 retains a bearing disc 56 functional with relation to the end of the journal 24. The bearing disc may be formed of the same plastic composition as the bushing 36.

The press fit of the journal 24 within the plastic bushing which fit, as before stated, is due solely to the portions 40 and 42 of the bushing, portion 44 having only a sliding fit with respect to the journal, is necessary in order to stabilize the joint with reference to forces tending to rock the arm 12 on the journal about axes angular to the rotative axis. It should be recognized that only the end portions of the bushing are resistant to any appreciable degree to these rocking forces. Hence it is possible to employ the relief 44 to the end of decreasing the resistance of the plastic bushing to rotative movement of the arm 12. The extent of the relief, that is, the length thereof, is determined by the design specification going to the torque required to rotate the arm on the journal under the no-load condition.

I claim:

1. A joint assembly permitting relative rotary movement between two parts one of which carries a generally cylindrical journal the other of which carries an eye having a generally cylindrical inner wall, said assembly being subject to forces tending to induce relative rocking movement of said parts about axes disposed angularly to the axis of the rotary movement and comprising a bushing sleeve formed of substantially non-resilient lubricous plastic material press fitted in said eye and within which said journal has a press fit, said bushing sleeve having an internal diameter at the end portions thereof less than its internal diameter over the portion thereof mediate said end portions, the press fit of said journal in said bushing being due solely to said end portions.

2. A joint assembly as defined by claim 1 in which the eye portion of said other part at one end thereof has an inwardly projecting annular rib and in which the bushing is provided at its corresponding end with an annular recess for seating a seal retained by said rib.

3. A joint assembly as defined by claim 2 in which the said journal has a free end and is annularly recessed near such end, in which the corresponding end of said eye portion is spun-over to seat a cover element retaining a bearing of plastic material against which the said free end of said journal turns and in which said last-mentioned recess accommodates a lock ring preventing axial separation of the parts of the joint.

References Cited in the file of this patent

UNITED STATES PATENTS

| | | |
|---|---|---|
| 2,775,793 | Cotchett | Jan. 1, 1957 |
| 2,944,829 | Herbenar | July 12, 1960 |
| 2,954,251 | Reuter et al. | Sept. 27, 1960 |
| 3,010,733 | Melton et al. | Nov. 28, 1961 |